April 19, 1932. C. W. ROBINSON 1,854,903
ROD WEEDER
Filed June 11, 1931 2 Sheets-Sheet 2
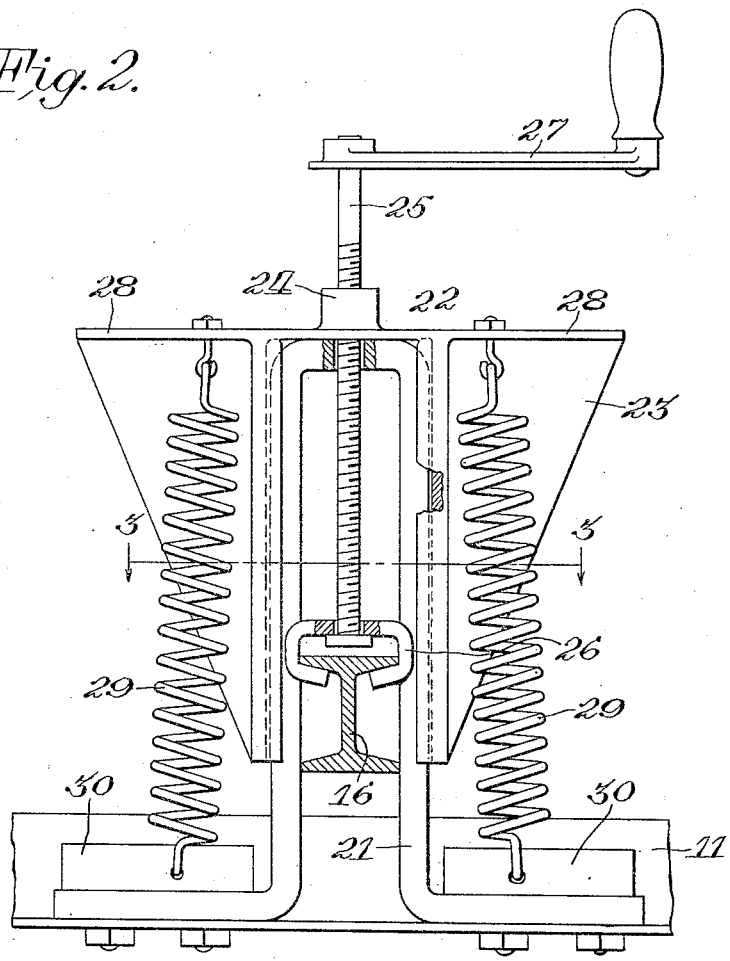
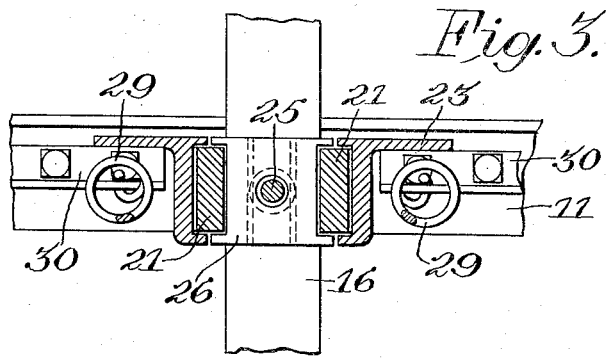
Inventor
Charles W. Robinson
By H. P. Devecate
Atty.

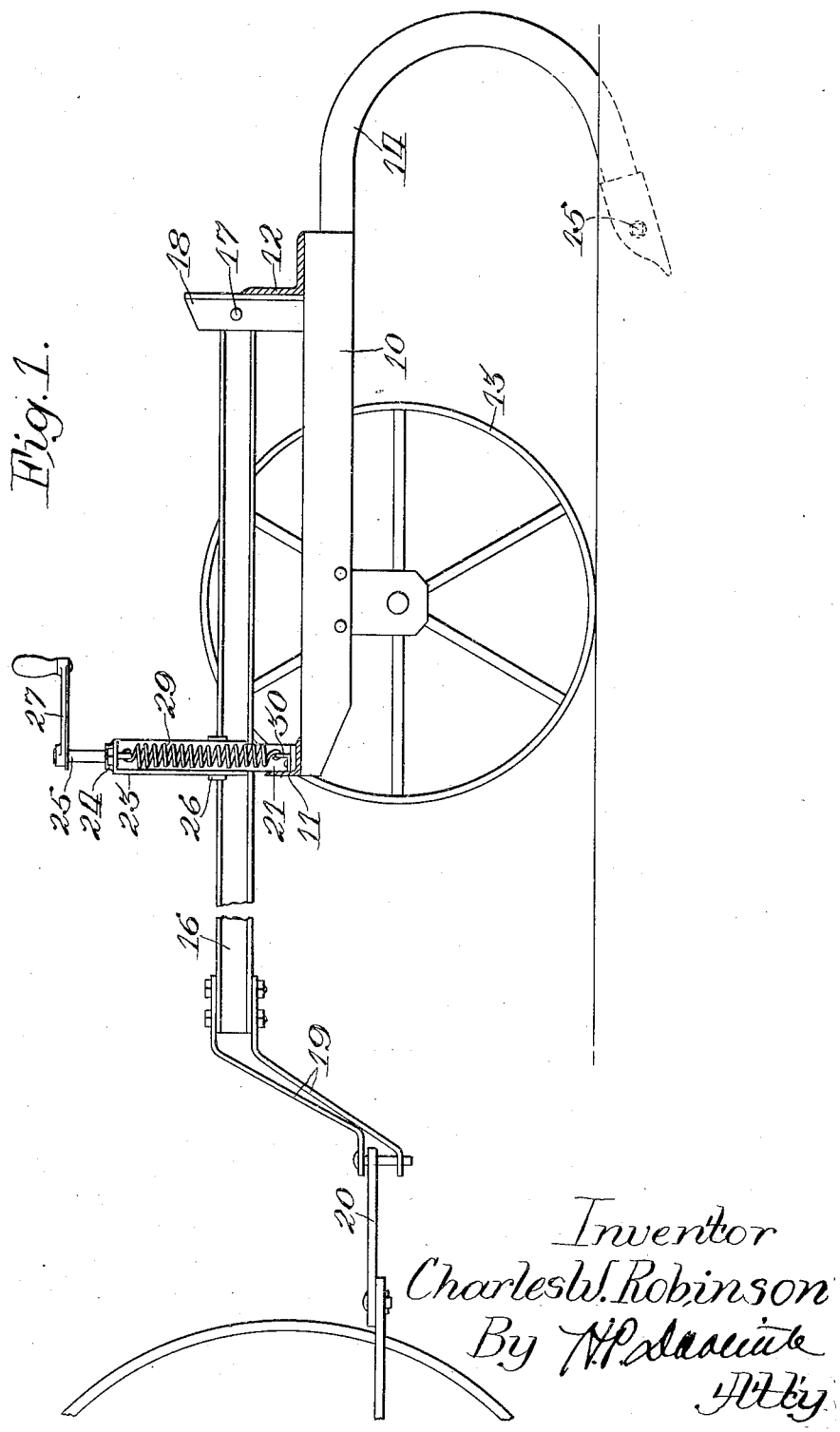

Patented Apr. 19, 1932

1,854,903

UNITED STATES PATENT OFFICE

CHARLES W. ROBINSON, OF HAMILTON, ONTARIO, CANADA, ASSIGNOR, BY MESNE ASSIGNMENTS, TO INTERNATIONAL HARVESTER COMPANY, OF CHICAGO, ILLINOIS, A CORPORATION OF NEW JERSEY

ROD WEEDER

Application filed June 11, 1931. Serial No. 543,601.

This invention relates to improvements in the type of cultivating implements known as rotary rod weeders.

The main object of the invention is to provide means for vertically adjusting the rod carrying frame to vary the position of the rod, and to incorporate in the adjusting mechanism means for permitting automatic vertical movement of the rod and its carrying frame when the rod strikes an obstruction in its path.

The foregoing and other minor objects and advantages, which will be made obvious in the description to follow, are obtained by the construction and arrangement of parts hereinafter described and claimed, and illustrated in the accompanying drawings, where:

Figure 1 is a side view of a rod weeder embodying the invention;

Figure 2 is an enlarged detail view with parts in section, showing the yieldable connecting means for the rod weeder frame as viewed from the rear; and, Figure 3 is a detail sectional view on line 3—3 of Figure 2.

In the present instance the invention is illustrated in connection with a rod weeder having the general construction and arrangement of parts shown in more detail in the United States patent to Robinson No. 1,801,979 of April 28, 1931. Such a machine consists of a laterally extended, rectangular main frame 10, which may be constructed with a front angle bar 11 and a similar rear bar 12. This frame is supported on transport wheels 13 at the ends of the frame, the axis of which is located intermediate the front and rear sides of the frame 10 and preferably somewhat forward of the central transverse line of the frame 10. The frame 10 has secured to it a plurality of rearwardly and downwardly curved standards, one of which is illustrated at 14, in the lower ends of which the usual rotary rod 15 is journaled. This rod may be driven in the usual way from one of the transport wheels. Above the main frame and in parallel relation thereto there is a draft frame which includes a central draft member 16, the rear end of which is pivoted at 17 to a bracket member 18 located back of the axis of the wheels and shown here as secured to the rear angle bar 12 of the main frame. The forward end of the draft member 16 is provided with downwardly extending forward bars 19 for connection to a tractor drawbar shown at 20, which forms a fixed support. The draft frame is, therefore, supported at one end on the tractor drawbar and is pivoted at its other end to the rear of the main frame 10, thereby permitting that frame to be rocked on the axis of its transport wheels.

In the practice of the present invention, a rod weeder constructed as above described is provided with an upright guide member 21 which preferably consists of an inverted U-shaped yoke, the arms of which straddle the draft member 16 and are formed with outwardly bent ends secured to the angle bar 11, as shown in Figure 2. The upper end, or bight portion, of the guide member 21 is formed with an aperture 22 for a purpose to be described. On the upright guide member 21 there is mounted a slide member 23 which is preferably formed as a U-shaped saddle piece, the transverse portion of which is formed with an internally screw-threaded boss 24 in alignment with the aperture 22, and the depending arms of which are formed with retaining flanges slidably embracing the arms of the guide 21. For adjustably supporting the slide 23, there is provided a screw-threaded shaft 25, which is swiveled at its lower end in a bearing piece 26 secured to the draft member 16. A crank handle 27 is provided at the upper end of the shaft 25 for effecting its rotation. Preferably the yoke piece 23 is formed with lateral extensions 28 at each side, which serve as anchor pieces for the connection of tension springs 29, the lower ends of which are connected to suitable lugs 30 screwed to the lower ends of the arms of the guide 21.

With the construction above described, it will be evident that there is at all times a yielding connection between the front side of the frame 10 and the draft member 16. That is, the guide member 21, which is fixed on the frame 10, will be free to move up and down in the slide 23, which, in effect, forms part of the draft member 16, as it is supported thereon by the shaft 25. The springs 29 are provided in order to assure return of the frame 10 to original position after the front portion has been swung downwardly by the lifting effect on the rear side of the frame of an obstruction struck by the rod, although the greater weight of the rear portion of frame 10 will alone tend to keep the frame in normal position. When it is desired to adjust the operating depth of the rod or to raise or lower it from the ground, the rotation of shaft 25 by means of crank 27 will cause the front side of frame 10 to be raised or lowered as desired with a corresponding opposite movement of the rear side of this frame and of the rod carried thereby.

There has accordingly been devised a simple and efficient device for permitting automatic yielding movement of a rod carrying frame in rod weeders of the type described, while at the same time permitting any desired adjustment of the rod to be effected. The preferred embodiment described is susceptable of modification within the scope of the following claims.

What is claimed is:

1. The combination with a rod weeder having a main frame rockably supported intermediate its front and rear sides on transport wheels, a ground engaging rotary rod carried by said frame back of the axis of said wheels and a draft member pivotally connected to the main frame back of the axis of said wheels and extending forwardly of the main frame above the same; of a yieldable adjusting connection between the frame and the draft member comprising an upright member secured to the forward portion of the frame adjacent the draft member, a slide on which the upright member is movable vertically, and vertically adjustable supporting means connecting the slide to the draft member.

2. The combination of claim 1, including a tension spring connecting the forward part of the main frame to the slide.

3. The combination of claim 1, the vertically adjustable supporting means for the slide comprising an upright shaft swiveled to the draft member and having a screw-threaded connection with the slide.

4. The combination with a rod weeder having a main frame rockably supported intermediate its front and rear sides on transport wheels, a ground engaging rotary rod carried by said frame back of the axis of said wheels and a draft member pivotally connected to the main frame back of the axis of said wheels and extending forwardly of the main frame above the same; of a yieldable adjusting connection between the frame and the draft member comprising an inverted U-shaped guide member secured to the forward side of the frame and straddling the draft member, a saddle piece having a crossbar above the guide member formed with a central screw-threaded boss and depending arms slidably engaging the sides of the guide member, a rotatable shaft swiveled on the draft member and screw-threaded in the boss, and coil springs connecting opposite sides of the saddle piece to the main frame.

In testimony whereof I affix my signature.

CHARLES W. ROBINSON.